US012573298B2

(12) United States Patent
Yamauchi

(10) Patent No.: US 12,573,298 B2
(45) Date of Patent: Mar. 10, 2026

(54) OBJECT RECOGNITION DEVICE, MOVABLE BODY COLLISION PREVENTION DEVICE, AND OBJECT RECOGNITION METHOD

(71) Applicant: DENSO CORPORATION, Kariya-city (JP)

(72) Inventor: Takuma Yamauchi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 273 days.

(21) Appl. No.: 18/174,439

(22) Filed: Feb. 24, 2023

(65) Prior Publication Data

US 2023/0215273 A1     Jul. 6, 2023

Related U.S. Application Data

(63) Continuation of application No. PCT/JP2021/027323, filed on Jul. 21, 2021.

(30) Foreign Application Priority Data

Aug. 26, 2020    (JP) ................................ 2020-142238

(51) Int. Cl.
| | |
|---|---|
| *G08G 1/16* | (2006.01) |
| *G06V 20/58* | (2022.01) |
| *G06V 20/64* | (2022.01) |
| *B60W 60/00* | (2020.01) |

(52) U.S. Cl.
CPC .............. *G08G 1/16* (2013.01); *G06V 20/58* (2022.01); *G06V 20/64* (2022.01); *B60W 60/001* (2020.02)

(58) Field of Classification Search
None
See application file for complete search history.

(56) References Cited

U.S. PATENT DOCUMENTS

| | | | | |
|---|---|---|---|---|
| 6,661,449 | B1 * | 12/2003 | Sogawa ................. | G06V 20/58 |
| | | | | 348/113 |
| 9,811,742 | B2 * | 11/2017 | Ogata ........................ | G06T 7/50 |
| 9,870,624 | B1 * | 1/2018 | Narang ..................... | G06T 7/74 |
| 10,796,167 | B2 * | 10/2020 | Gomezcaballero .... | G08G 1/166 |
| 2017/0098132 | A1 * | 4/2017 | Yokota .................... | G06T 7/194 |
| 2017/0120902 | A1 * | 5/2017 | Kentley ................ | B60W 10/18 |
| 2017/0174227 | A1 * | 6/2017 | Tatourian ............... | G06V 20/58 |
| 2018/0178722 | A1 * | 6/2018 | Ohta ....................... | G01S 13/08 |
| 2019/0179023 | A1 * | 6/2019 | England .......... | B60W 30/18145 |
| 2019/0347492 | A1 * | 11/2019 | Morimura ........... | B60W 60/001 |

(Continued)

*Primary Examiner* — Redhwan K Mawari
*Assistant Examiner* — Kai Wang
(74) *Attorney, Agent, or Firm* — Maschoff Brennan

(57) ABSTRACT

An object recognition device includes a first sensor that acquires an image of an object present outside a movable body, a second sensor that detects a distance to the object, and a recognition unit that recognizes a position of the object with respect to the movable body and a shape of the object at the position by using outputs from the first sensor and the second sensor. If determining that the object is a first type object having a size equal to or more than a predetermined size, the recognition unit determines an actual shape of the object based on an image of the object acquired by the first sensor and the distance detected by the second sensor, and recognizes that the object is present as the actual shape at a position distanced from the movable body by the distance.

12 Claims, 12 Drawing Sheets

(56)        References Cited

U.S. PATENT DOCUMENTS

| | | | |
|---|---|---|---|
| 2021/0114590 A1 | 4/2021 | Matsunaga | |
| 2021/0192231 A1* | 6/2021 | Lee | G05D 1/0231 |
| 2021/0319237 A1* | 10/2021 | Kim | G06V 10/755 |
| 2022/0092876 A1* | 3/2022 | Shokonji | G05D 1/249 |

* cited by examiner

| OBJECT NUMBER | OBJECT SHAPE (COORDINATES OF FOUR VERTEXES) | ESTIMATED DISTANCE L1 | ESTIMATED DISTANCE L2 |
|---|---|---|---|
| 1 | xy11,xy12, xy13,xy14 | L 1 (1) | L 2 (1) |
| 2 | xy21,xy22, xy23,xy24 | L 1 (2) | L 2 (2) |
| ⋮ | ⋮ | ⋮ | ⋮ |
| m | xym1,xym2, xym3,xym4 | L 1 (m) | L 2 (m) |
| ⋮ | ⋮ | ⋮ | ⋮ |

| OBJECT NUMBER | OBJECT SHAPE (COORDINATES OF FOUR VERTEXES) | ESTIMATED DISTANCE L |
|---|---|---|
| 1  (SECOND TYPE) | xy11,xy12, xy13,xy14 | L 2 (1) |
| 2  (FIRST TYPE) | XY21,XY22, XY23,XY24 | L 2 (2) |
| ⋮ | ⋮ | ⋮ |
| m  (FIRST TYPE) | XYm1,XYm2, XYm3,XYm4 | L 2 (m) |
| ⋮ | ⋮ | ⋮ |

OBJECT RECOGNITION DEVICE, MOVABLE BODY COLLISION PREVENTION DEVICE, AND OBJECT RECOGNITION METHOD

CROSS-REFERENCE TO RELATED APPLICATION

The present application is based on and claims the benefit of priority from earlier Japanese Patent Application No. 2020-142238 filed on Aug. 26, 2020, the description of which is incorporated herein by reference.

BACKGROUND

Technical Field

The present disclosure relates to a technique for recognizing an object present outside a moving body such as a vehicle and preventing a collision by using a result of the recognition.

Related Art

In order to improve safety when a movable body such as an automobile is traveling, various techniques have been developed which are for recognizing an object present outside the moving body, such as another vehicle, a motorcycle, a pedestrian, and a guardrail.

SUMMARY

An aspect of the present disclosure provides an object recognition device, including: a first sensor that acquires an image of an object present outside a movable body; a second sensor that detects a distance to the object; and a recognition unit that recognizes a position of the object with respect to the movable body and a shape of the object at the position by using outputs from the first sensor and the second sensor. If determining that the object is a first type object having a size equal to or more than a predetermined size, the recognition unit determines an actual shape of the object based on an image of the object acquired by the first sensor and the distance detected by the second sensor, and recognizes that the object is present as the actual shape at a position distanced from the movable body by the distance.

BRIEF DESCRIPTION OF THE DRAWINGS

In the accompanying drawings:

FIG. 4A is an explanatory diagram illustrating an example of list data;

DETAILED DESCRIPTION OF THE PREFERRED EMBODIMENTS

In order to improve safety when a movable body such as an automobile is traveling, various techniques have been developed which are for recognizing an object present outside the moving body, such as another vehicle, a motorcycle, a pedestrian, and a guardrail. Recognizing a position, a size, a traveling state, and the like of the object outside the movable body with high accuracy can apply a brake to automatically reduce an own vehicle speed or stop the own vehicle to avoid a collision, and can steer to avoid a collision. Other than such collision avoidance, as a technique for recognizing an object with high accuracy in order to perform autonomous driving, for example, in JP-A-2020-8288, a technique for recognizing an object and avoiding a collision is disclosed.

The technique described in JP-A-2020-8288 is excellent for three-dimensionally recognizing an own vehicle and an object to avoid a collision and uses a millimeter-wave radar to detect a distance to the object. In contrast, recently, various embodiments have been proposed in which an imaging device such as a camera is used or the imaging device and a radar are combined to recognize a position and a shape of an object. Techniques are required which use the imaging device to correct errors and the like generated when a position and a shape of an object are recognized and recognize the object, thereby avoiding a collision.

A: First Embodiment

Figure 1:
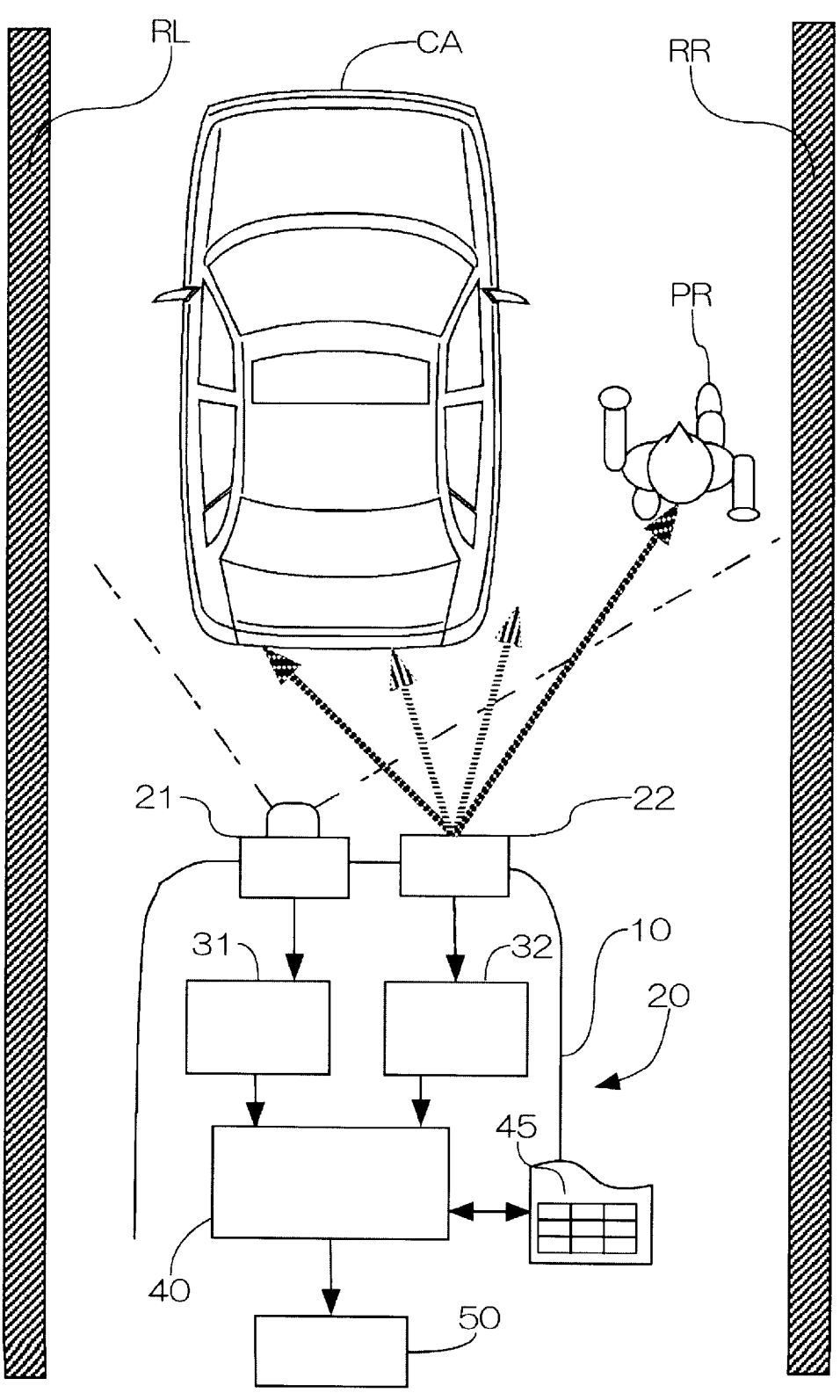
FIG. 1 is a diagram illustrating a schematic configuration of an object recognition device of an embodiment.

As shown in FIG. 1, an object recognition device 20 of the first embodiment is mounted to a vehicle 10, which is a movable body, and includes a camera 21 as a first sensor provided to a front surface of the vehicle 10 and a millimeter-wave radar 22 as a second sensor. The camera 21 captures a two-dimensional image at the predetermined number of frames and outputs the image as a video signal. The captured image may be a color image or a black-and-white image. The imaging range may be a predetermined range to be recognized in front of the vehicle 10. When objects lateral to or behind the vehicle 10 are required to be recognized, the camera 21 may be disposed so as to be oriented in the lateral or the rear direction. The millimeter-wave radar 22 outputs pulsed millimeter waves and measures a distance to an object present in the direction in which the millimeter waves are radiated, based on the time period until reflected waves are received. In the present embodiment, the millimeter-wave radar 22 sequentially measures time periods until reflected waves return while two-dimensionally scanning a predetermined range. When the vehicle 10 is clearly distinguished from another vehicle, the vehicle 10 may be referred to as an own vehicle 10.

The object recognition device 20 includes an extraction unit 31 that receives a video signal from the camera 21 and extracts an object included in the video, a distance measurement unit 32 that analyzes a signal received from the millimeter-wave radar 22 to detect a distance to an object present ahead of the object recognition device 20, a recognition unit 40 that recognizes the object by using a detection result of the object of the extraction unit 31 and the distance measured by the distance measurement unit 32, an output unit 50 that outputs a recognition result of the recognition unit 40, and a database 45 that stores the recognition result of the recognition unit 40.

In the present embodiment, it is assumed that the vehicle 10 to which the object recognition device 20 is mounted travels on a roadway defined by a left side RL and a right side RR of a road, and another four-wheeled vehicle CA (hereinafter, referred to as another vehicle CA) and a pedestrian PR are present in front of the vehicle 10. The object present on a travel path such as a roadway may be a four or more-wheeled vehicle or a small movable object that has a size distinctly different from that of a four-wheeled vehicle such as a pedestrian, a motorcycle, a bicycle, an electric cart, and a wheelchair. Hereinafter, the former, that is, the four or more-wheeled vehicle is referred to as a first type movable body, and the latter, that is, the movable body such as a motorcycle smaller than the first type movable body is referred to as a second type movable body.

Figure 2:
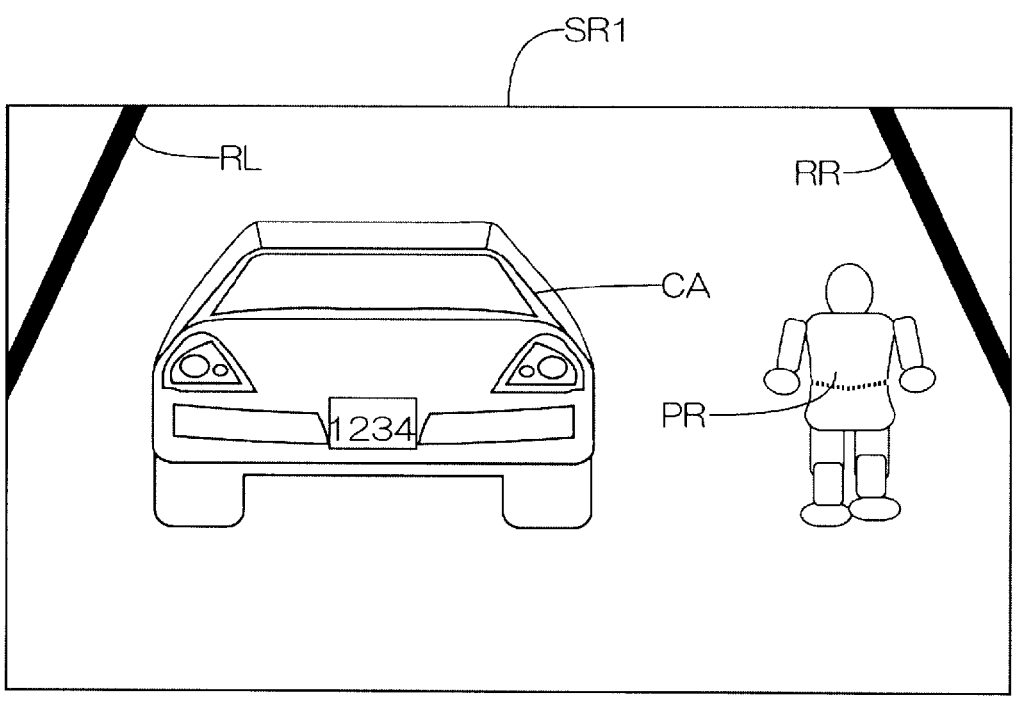
FIG. 2 is an explanatory diagram illustrating an example of an image captured by a camera, which is a first sensor.

FIG. 2 illustrates a frame image SR1 of video captured by the camera 21. In this example, images of the rear of the other vehicle CA and a back view of the pedestrian PR, and the left side RL and the right side RR of the road are captured. The extraction unit 31 extracts an object from the frame image SR1. The extraction of the object from the frame image SR1 can be easily implemented by previously performing machine learning such as deep learning. In the example illustrated in FIG. 1, the other vehicle CA and the pedestrian PR are extracted.

The recognition unit 40 includes a well-known computer (hereinafter, simply referred to as a CPU) and memories such as a ROM and a RAM and performs arithmetic-logic operation according to a prepared program prepared in the ROM or the like to perform processing for recognizing an object. In FIG. 1, the extraction unit 31 and the distance measurement unit 32 are shown separately from the recognition unit 40. However, as described below, the extraction unit 31 and the distance measurement unit 32 may be implemented together with the recognition unit 40 according to the program executed by the recognition unit 40.

Figure 3:
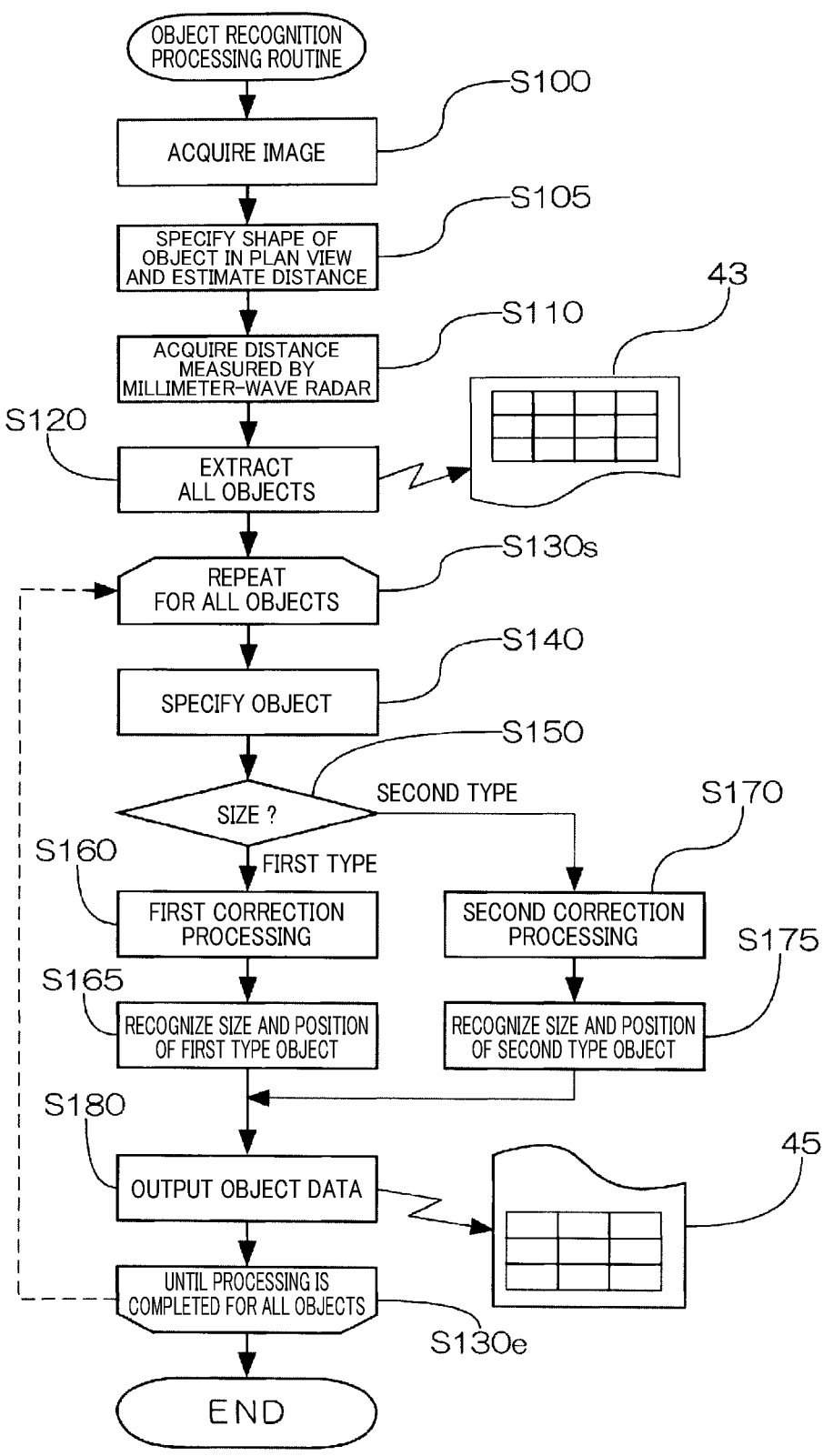
FIG. 3 is a flowchart illustrating an object recognition processing routine according to the first embodiment.

An object recognition processing routine performed by the CPU provided to the recognition unit 40 will be described with reference to FIG. 3. On starting the object recognition processing routine, the CPU of the recognition unit 40 first performs processing for acquiring an image (step S100). Acquiring an image means reading each frame image SR1 forming video captured by the camera 21. Next, the CPU specifies an image of an object and estimates a distance based on the acquired frame image SR1 (step S105). This processing corresponds to processing performed by the extraction unit 31 referring to FIG. 1.

Specifying an image of an object from the frame image SR1 is performed by extracting a range of video of the object included in the frame image SR1 by using machine learning or the like. Although objects may overlap with each other when viewed from the camera 21, such image recognition by which a near object A and a far object B, part of which is hidden by the object A, are distinguished from each other can be performed by machine learning. Next, the image of the recognized object is subjected to coordinate conversion and is converted to a plan view image (hereinafter, also referred to a bird's-eye image as required). A quadrangular shape circumscribed to the bird's-eye image is handled as a set of coordinates of four vertexes.

Simultaneously, the CPU estimates a distance L1 to the object. Various types of processing for estimating the distance L1 to the object based on the frame image SR1 acquired by the monocular camera 21 are known. For example, applying automatic focus to an object at the center of the camera 21 can easily estimate the distance L1 to the object present at the center. Regarding an object, which is out of focus when automatic focus is used, a deviation from the position that is in focus can be recognized from the state of blurring. Hence, using this can estimate the distance L1 to each object included in the frame image SR1.

Even when an afocal camera or a camera having a relatively deep focal depth is used, and automatic focus is not utilized, the shape of the object and scenery information such as a background can be learned by deep learning to estimate the distance L1 to the object. For example, attaching a two-color filter to a lens and analyzing the color and size of a blur of an image generated depending on the distance to the object can estimate the distance L1. Alternatively, a technique is known in which how an image is blurred (the shape of the blur) depending on a position on a lens is analyzed by utilizing deep learning to estimate a distance based on the frame image SR1 obtained from the monocular camera 21. In addition, displacing the position of the camera 21 finely can estimate the distance L1 to an object from the amount of change of the position of the object in the frame image SR1 due to the displacement. The reason is that when the position of the camera is changed, the displacement of the position in the frame image SR1 is smaller as the position is farther from the camera.

After the shape of the object in plan view is specified and the position of the object is estimated based on the frame image SR1 acquired by the camera 21 (step S105), the CPU next performs processing for reading the distance L2, which is a measurement result, from the millimeter-wave radar 22 (step S110). In addition, the CPU utilizes the specified shape of the object in plan view and an estimation result of the distance L1 based on the frame image SR1 acquired from the camera 21 and the distance L2, which is a result of the distance measurement by the millimeter-wave radar 22, to perform processing extracting all objects included in the acquired image (step S120). The extracted object is stored as list data 43. An example of the list data is illustrated in FIG. 4A. As illustrated in FIG. 4A, the list data representing objects include object numbers N distinguishing the list data, the shape of the object in plan view determined from a frame image acquired from the camera 21, the distance L1 to the object, and the distance L2 measured by the millimeter-wave radar 22. The shape of the object in plan view is represented by coordinates of vertexes of a quadrangular shape circumscribed to the object. The vertexes of a quadrangular shape circumscribed to the object will be described in detail later.

After all the objects included in the frame image SR1 are extracted as described above, the CPU repeats the processing from step S130s to S130e for each of the objects. Specifically, the CPU first specifies one of the extracted objects, for example, an object m illustrated in FIG. 4A (step S140). At this time, the CPU additionally generates a rectangle CG surrounding a bird's-eye image BG indicating the shape of the object in plan view. The rectangle CG is a quadrangular shape circumscribed to the object (herein, the bird's-eye image of the other vehicle CA). Next, the size of the object extracted as the rectangle CG is determined (step S150). In this stage, since the size of the bird's-eye image BG of the object, that is, the object in plan view and the estimated distance L1 are recognized, the actual size can be easily approximated.

After the determination concerning the size of the object (step S150), if determining that the object is a first type object, that is, the four or more-wheeled vehicle CA, the CPU performs first correction processing for correcting the acquired image (step S160). An overview of the first correction processing will be described with reference to FIG. 4B. The first correction processing is performed if an object is determined to be a first type object. In the first correction processing, an actual shape of the object in plan view is determined from an image of the object acquired by the camera 21, which is a first sensor, and a distance detected by the millimeter-wave radar 22, which is a second sensor. Specifically, the CPU first estimates that the bird's-eye image BG of the object obtained by coordinate conversion from the frame image SR1 acquired by the camera 21, herein, the other vehicle CA present in front of the own vehicle 10 is at the distance L1. The bird's-eye image BG of the object is handled as the rectangle CG circumscribed to the bird's-eye image BG.

Figure 4B:
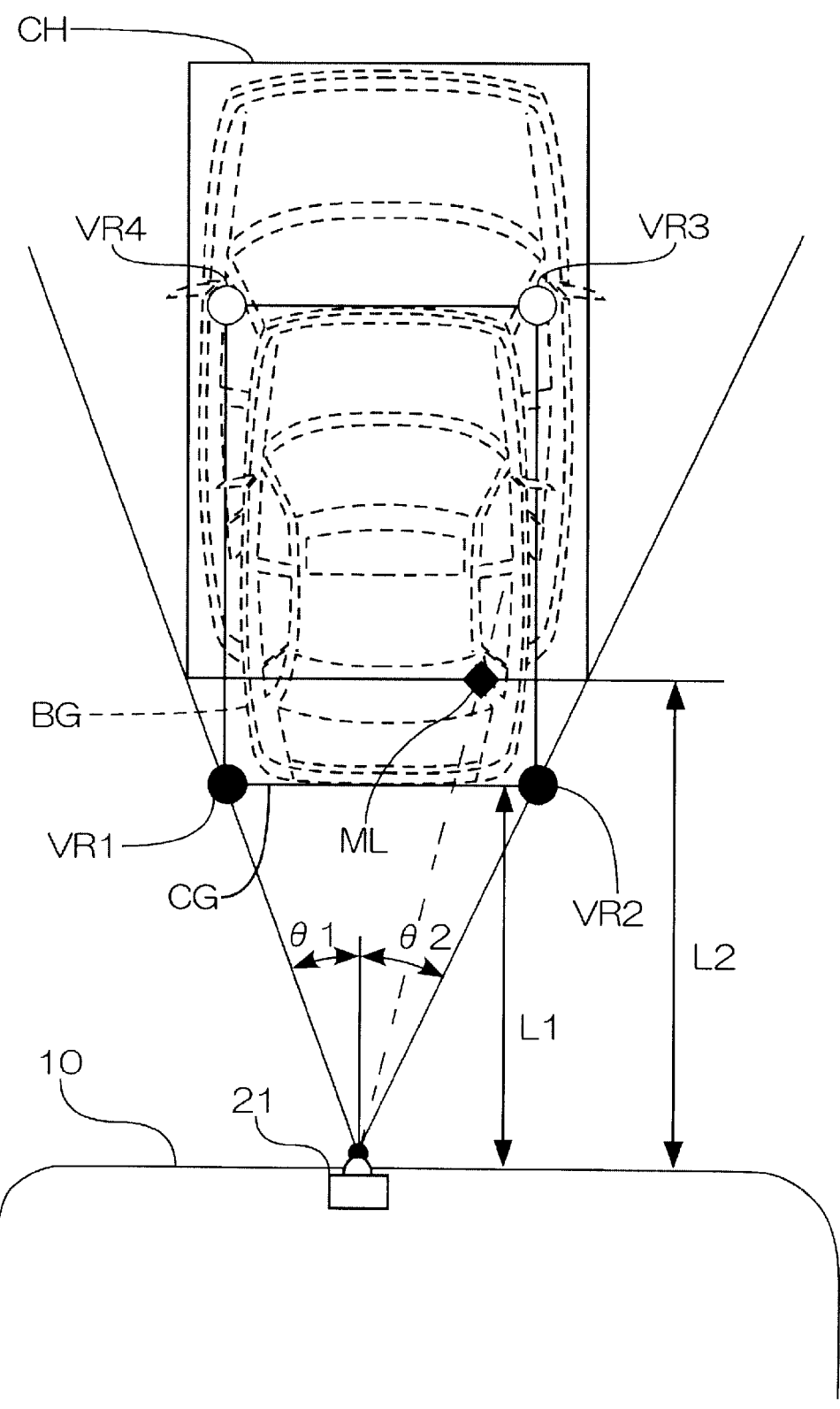
FIG. 4B is an explanatory diagram for describing a technique of a first correction of an example of an object.
Figure 4C:
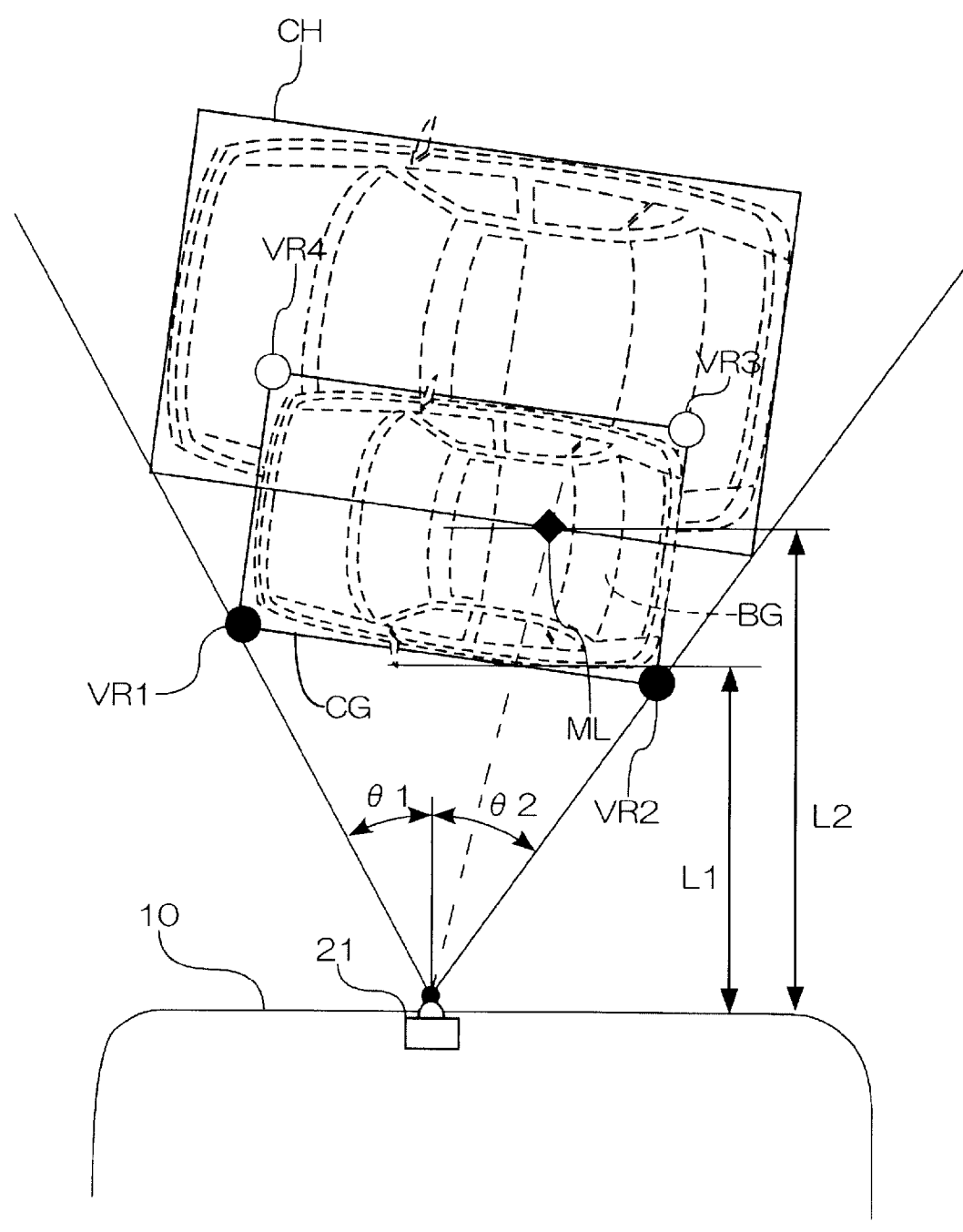
FIG. 4C is an explanatory diagram illustrating the technique of the first correction of an object having a different shape.

In addition, in the first correction processing, among four vertexes VR1-VR4 of the rectangle CG surrounding the other vehicle CA, which is the first type object, two left and right vertexes VR1 and VR2 near the own vehicle 10 are specified, and an enlarged rectangle CH is determined when the rectangle CG is present at the distance L2 while an angle θ1 and an angle θ2 of the vertex VR1 and the vertex VR2 in the left and right direction with respect to the position of the camera 21 of the own vehicle 10 is maintained. That is, the size of the other vehicle CA in plan view when the other vehicle CA in front of the own vehicle 10 is not present at the distance L1 estimated from the frame image acquired by the camera 21 but is present at the distance L2 measured by the millimeter-wave radar 22 is determined as the enlarged rectangle CH similar to the rectangle CG. In FIG. 4B and FIG. 4C described later, the position at which the object is subjected to distance measurement by the millimeter-wave radar 22 is indicated by a reference sign ML. The position ML for the distance measurement may be any part of the object.

In FIG. 4B, the rectangle CG having a circumscribed quadrangular shape surrounding the other vehicle CA is substantially parallel to the own vehicle 10. However, actual objects have various sizes and various positional relationships. Hence the rectangles CG obtained from the objects have various shapes and angles. The distance measurement positions at which a distance to an object is measured by the millimeter-wave radar 22 may be different in the objects or distance measurement. FIG. 4C illustrates an example of another object. In the example illustrated in FIG. 4C, the other vehicle CA is diagonally crossing an area in front of the own vehicle 10 from the right side. Hence, the quadrangular shape circumscribed to the object is recognized as the inclined rectangles CG surrounding the bird's-eye image BG of the object obtained by subjecting the object, which is extracted from the frame image SR1, to coordinate conversion. As in the example illustrated in FIG. 4B, among the four vertexes VR1-VR4 of the rectangle CG, the two left and right vertexes VR1 and VR2 near the own vehicle 10 are specified, and the enlarged rectangle CH is determined when the rectangle CG is present at the distance L2 while an angle θ1 and an angle θ2 of the vertex VR1 and the vertex VR2 in the left and right direction with respect to the position of the camera 21 of the own vehicle 10 is maintained. If the rectangle CG circumscribed to the object is further inclined, the angle θ2 of the vertex far from the own vehicle (e.g., vertex VR3 in FIG. 4C) from the position of the camera 21 may be larger than that of the vertex near the own vehicle (e.g., vertex VR2). In this case, the enlarged rectangle CH may be determined by using the vertex far from the own vehicle. In these examples, the distance L2 measured by the millimeter-wave radar 22 is longer than the distance L1 estimated from a frame image. However, there may be a case of L2<L1 obviously. Even in such a case, the corrected rectangle may be determined as a similar shape. The corrected rectangle is reduced from the original rectangle.

The CPU performs the processing described above as the first correction processing (step S160) and recognizes the position of the object based on the size of the object that has been subjected to the correction processing and the distance L2 of the object (step S165).

Figure 5:
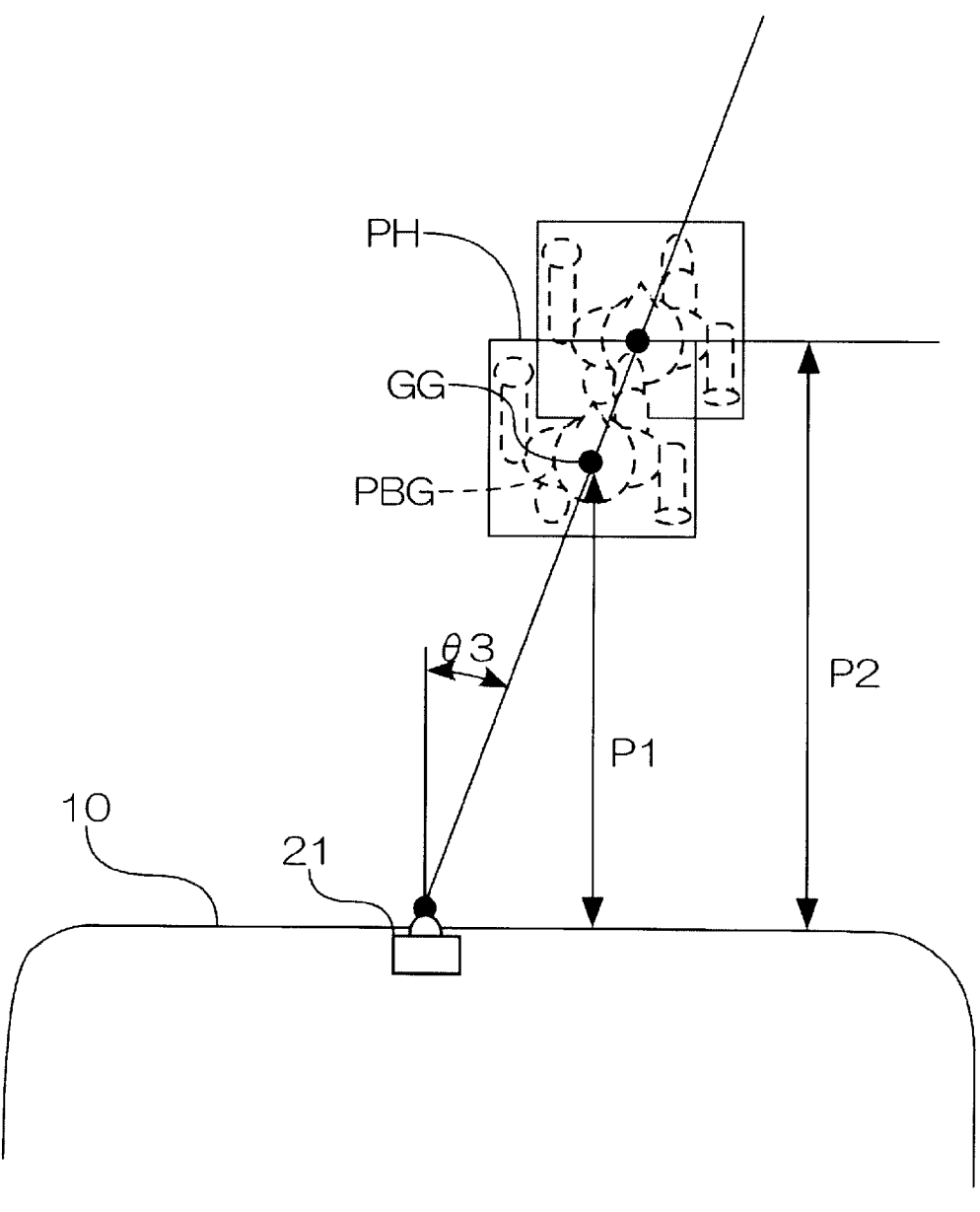
FIG. 5 is an explanatory diagram for describing a technique of a second correction.

In contrast, in step S150, if it is determined that the object is a second type object, that is, a two-wheeled vehicle, a pedestrian, or the like, which are smaller than the four or more-wheeled vehicle CA, the CPU corrects the acquired image by the second correction processing (step S170). An overview of the second correction processing will be described with reference to FIG. 5. The second correction processing is performed if an object is determined to be a second type object. In the second correction processing, an actual shape of the object is corrected assuming to be present at a distance P2 detected by the millimeter-wave radar 22, which is the second sensor, while the size of bird's-eye image PBG obtained by subjecting an image PR of the object acquired by the camera 21, which is the first sensor, to coordinate conversion is maintained. Specifically, the CPU first estimates that an object, herein the pedestrian PR in front of the own vehicle, is present at a distance P1, based on the frame image SR1 acquired by the camera 21.

In addition, in the second correction processing, the CPU determines the position of a rectangle PH when the rectangle PH is present at the distance P2 while maintaining the size of the rectangle PH surrounding the bird's-eye image PBG of a pedestrian obtained by subjecting the pedestrian PR, which is the second type object, to coordinate conversion and maintaining an angle θ3 of a representative point GG of the rectangle PH with respect to the position of the camera 21. That is, the bird's-eye image PBG corresponding to the pedestrian PR, which is the second type object, is recognized not assuming that the forward pedestrian PR is present at the distance estimated from the frame image acquired by the camera 21 but assuming that the pedestrian PR is present at the distance P2 measured by the millimeter-wave radar 22.

Figures 6, 7:
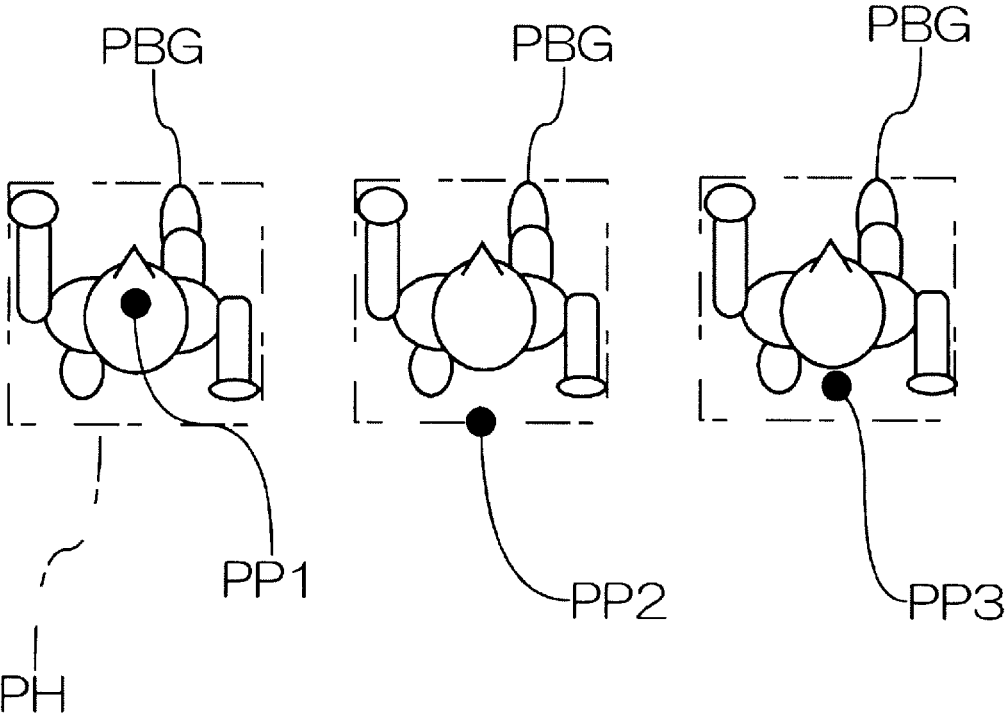
FIG. 6 is an explanatory diagram illustrating representative points of the second correction.
FIG. 7 is an explanatory diagram illustrating an example of data of an object stored in a database.

When the second correction is performed for the second type object, the position of the second type object (herein, the pedestrian PR) is corrected by using the representative point GG representing the rectangle PH. However, as the representative point GG, the position of the center of gravity of the rectangle PH circumscribed to the shape of the image in the bird's-eye image PBG may be used. The representative point GG is not limited to the position of the center of gravity, and another representative point such as the center point of the rectangle PH may be used. As illustrated in FIG. 6, when the distance P1 from the camera 21 is assumed, the representative point on a plane of the object may be a center point PP1 of the rectangle PH circumscribed to the second object in plan view or a point PP2 on the edge on the camera 21 side. Alternatively, the representative point may be a point PP3 defined as a position displaced from the front edge at a predetermined distance in the central direction. The CPU performs the above second correction processing (step S170) and recognizes the position of the object based on the size of the object (rectangle PH) and the distance P2 (step S175).

After the first correction processing (step S160) or the second correction processing (step S170) depending on the determination of the size of the object described above and the succeeding recognition of the size of the object in plan view and the position of the object (step S165 or S175), the CPU performs processing for storing the data of the recognized object in the database 45 (step S180). An example of the data of the object stored in the database 45 is illustrated in FIG. 7. As illustrated in FIG. 7, the data of each object includes the number N identifying the object, coordinates of four vertexes indicating a corrected shape of the object, and the distance L2 to the object. The above processing (step S140 to S180) is repeated for all the objects stored in the list data 43. If determining that the processing has been completed for all the objects (step S130e), the CPU ends the present processing routine.

According to the object recognition device 20 described above, the size of an object and a distance from the own vehicle 10 to the object are estimated from an image acquired by the monocular camera 21, and different corrections, that is, the first correction for the first type object and the second correction for the second type object are applied regarding the size and distance of the object, if the object is determined to be the first type object, which is a four or more-wheeled vehicle, and if the object is determined to be the second type object, which is smaller than the four or more-wheeled, such as a two-wheeled vehicle and a pedestrian, respectively. The corrections use a distance to the object determined by the millimeter-wave radar 22. In the first correction, while angles of two vertexes of a polygon circumscribed to the object, herein, a rectangle having a quadrangular shape, with respect to the camera 21 is maintained, the size of the object is enlarged or reduced to determine the size and the position of the object in plan view. In the second correction, while the size of the rectangle circumscribed to the object and an angle of a representative point representing the rectangle with respect to the camera 21 are maintained, the size and the position of the object in plan view are determined. Hence, the size and position of either of the first type object and the second type object smaller than the first type object can be recognized more accurately. Since the first type object has a size of a four or more-wheeled vehicle, accuracy in detecting the shape with resolution of the camera 21, specifically, accuracy in detecting a position of a vertex can be increased above a certain level. Hence, the shape can be corrected with high accuracy by using the distance measured by the millimeter-wave radar 22. In the case of a four or more-wheeled vehicle, from a small four wheeled vehicle to a large-sized bus or truck, the possible range of the shape and the size is wider than that of the second type object. Hence, regarding the first type object, the significance of recognizing the object by using the distance measured by the millimeter-wave radar 22 and correcting the size of the object is great.

In contrast, since the second type object is a two-wheeled vehicle or a pedestrian smaller than the first type object, the accuracy in recognizing a shape obtained from an image acquired by the camera 21 may be relatively lower than that for the first type object. The possible range of the shape of the second type object is also typically narrow. Hence, regarding the second type object, even when the correction using the distance measured by the millimeter-wave radar 22 is not performed, and the size and the shape are maintained, influence on the accuracy in recognizing the object is small. Rather, no correction can prevent errors from being generated due to the correction.

B: Second Embodiment

Figure 8A:
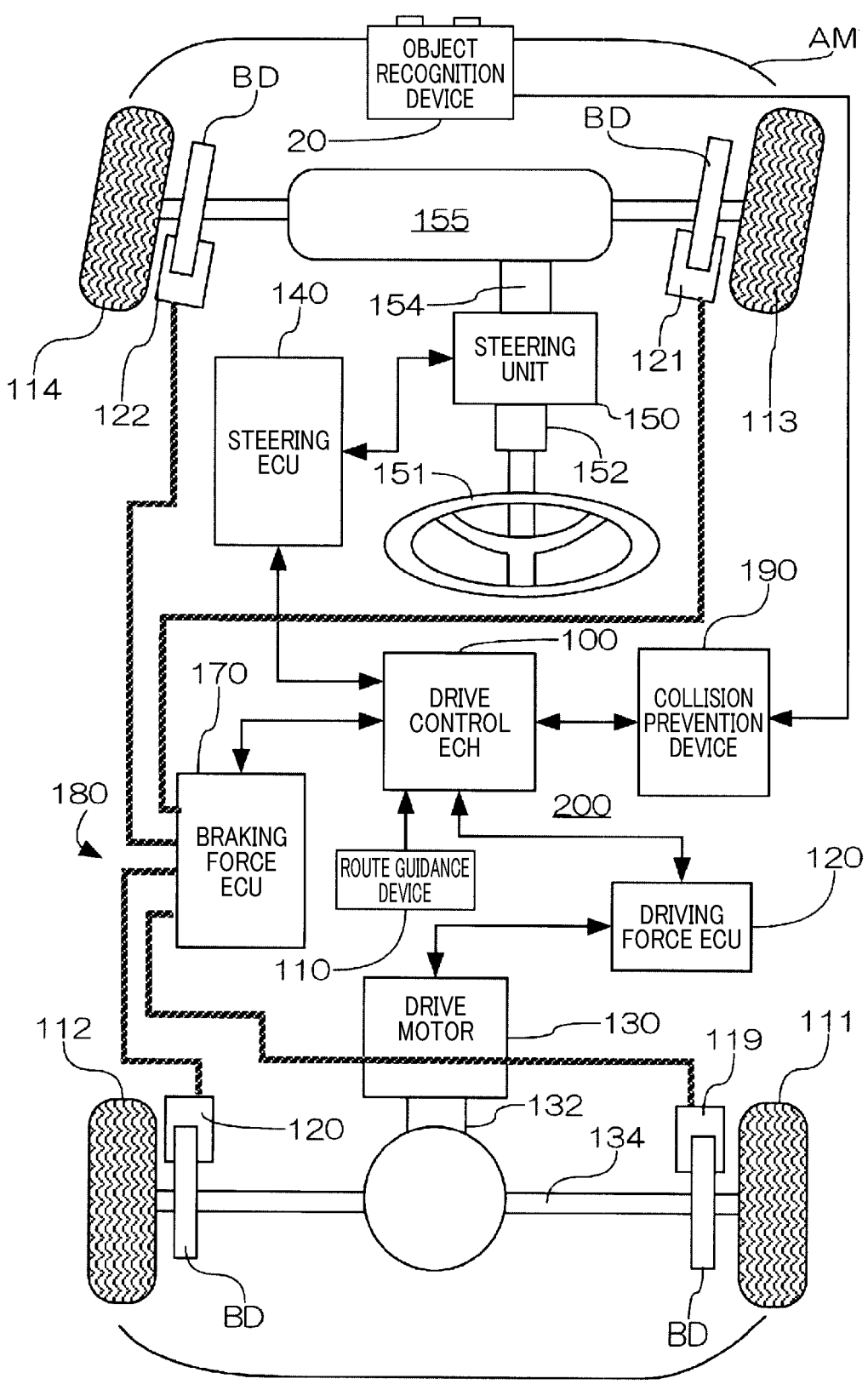
FIG. 8A is a diagram illustrating a schematic configuration of a vehicle drive control device including a collision prevention device of a second embodiment and a vehicle to which the vehicle drive control device is mounted.

Next, as the second embodiment, a vehicle drive control device 200 including the object recognition device 20 and a collision prevention device 190, and a vehicle AM to which the drive control device 200 is mounted will be described. A schematic configuration of the vehicle drive control device 200 is illustrated in FIG. 8A. The vehicle drive control device 200 controls driving of the vehicle AM. The vehicle drive control device 200 includes a drive control ECU 100 that implements autonomous driving within a certain range in accordance with routing from a route guidance device 110 that guides a route to a destination. Hence, when the destination is set, and the vehicle AM is subjected to autonomous driving, the drive control ECU 100 previously recognizes a travel route of the vehicle from the present location to the destination. In addition, the drive control ECU 100 is provided with a triaxial acceleration sensor such as a yaw rate sensor, not shown, and can predict a travel route of the vehicle AM in time series. The data on the predicted sequential travel route is output from the drive control ECU 100 to the collision prevention device 190. Since the vehicle AM is provided with a steering wheel 151 and a brake pedal, not shown, the driver can intervene in driving. Change of a vehicle travel route due to the intervention of the driver in driving can be detected based on accelerations along the axes received from various sensors connected to the drive control ECU 100. Hence, even in such a case, a travel route of the vehicle AM can be easily predicted in time series.

The drive control device 200 includes, in addition to the drive control ECU 100, the object recognition device 20, and the collision prevention device 190 described above, a number of units such as a driving force ECU 120, a drive motor 130, a braking force ECU 70, a steering ECU 140, and a steering unit 150. The ECUs and units are connected via a network CAN, which is an in-vehicle LAN, not shown. The ECUs continuously transmits/receives data and commands to/from each other.

The driving force ECU 120 controls driving force for driving the vehicle AM. The driving force ECU 120 receives an instruction from the drive control ECU 100 and controls driving force of the drive motor 130. The drive motor 130 receives electrical power from a battery, not shown, via an inverter, not shown, and rotates. The driving force ECU 120 directly controls the inverter. The driving force of the drive motor 130 is transferred to right and left rear wheels 111, 112 via a differential gear 132 and a drive shaft 134. Although rear wheel drive is applied to the present embodiment, front wheel drive or four-wheel drive may be applied. The vehicle AM of the present embodiment has a configuration as a so-called electric vehicle.

The steering unit 150 includes an encoder 152 that detects a steering amount (rotation angle) of the steering wheel 151 and a steering motor 154 that drives a steering gear 155. The steering motor 154 of the steering unit 150 controls steering angles (angle with respect to the traveling direction) of right and left front wheels 113, 114 via the steering gear 155. The steering gear 155 applies required turning radii to the respective steering angles of the right and left front wheels 113, 114.

Next, a mechanism for applying braking force to the wheels 111 to 114 will be described. As illustrated in FIG. 8A, each of the wheels 111 to 114 is provided with a disc brake unit including a brake disc BD, a wheel cylinder 119-122, and the like, whereby braking force for each of the wheels can be controlled. The brake disc BD provided to the wheels 111-114 is inserted into the wheel cylinder 119-122 with an attached disc pad (not shown). Frictional force between the disc pad and the brake disc generated braking force. Hydraulic pressure driving the wheel cylinders 119 to 122 is supplied from a hydraulic brake generator, not shown, via hydraulic piping 180. A braking force ECU 170 controls hydraulic pressure applied to the wheel cylinders 119 to 122 and controls braking force of the vehicle AM.

The driving force ECU 120, the steering ECU 140, and the braking force ECU 170 described above are connected to the drive control ECU 100 and receive instructions from the drive control ECU 100, thereby adjusting steering angles of the wheels 113, 114, braking force of the wheels 111 to 114, and driving force of the wheels 111, 112, which are drive wheels. Accordingly, the vehicle AM travels along the route received from the route guidance device 110.

The drive control ECU 100 is also connected with the collision prevention device 190. The collision prevention device 190 is connected with the object recognition device 20. The object recognition device 20, which is described in the first embodiment, recognizes an object based on signals from the camera 21 and the millimeter-wave radar 22 and outputs the recognition result to the collision prevention device 190. The recognition result of the object of the object recognition device 20 is transferred as data stored in the database 45 as described later.

Figure 8B:
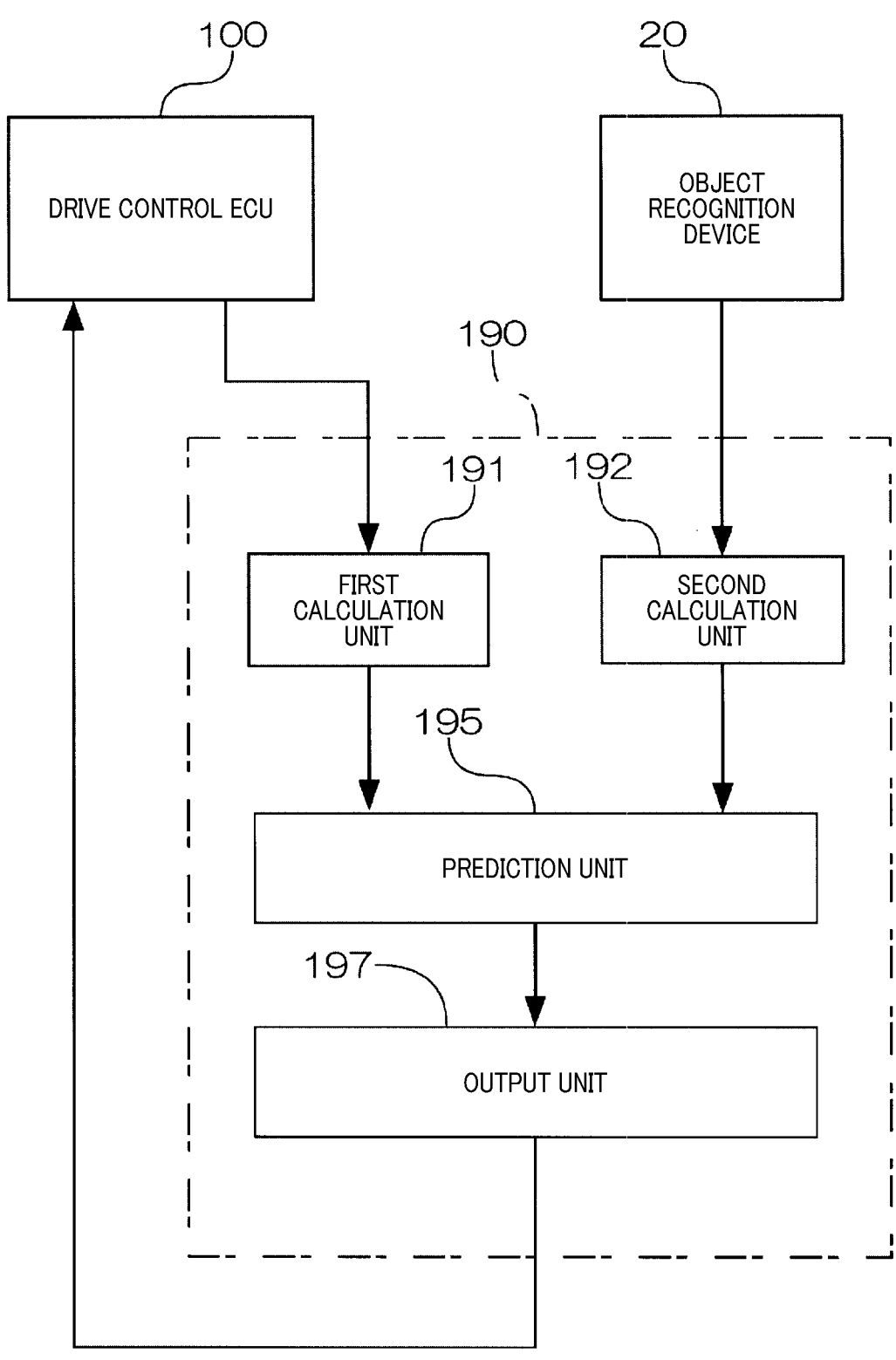
FIG. 8B is a diagram illustrating a schematic configuration of the collision prevention device.

An internal configuration of the collision prevention device 190 is illustrated in FIG. 8B. As illustrated in FIG. 8B, the collision prevention device 190 includes a first calculation unit 191, a second calculation unit 192, a prediction unit 195, and an output unit 197. The first calculation unit 191 is connected to the drive control ECU 100 and performs calculation for determining a travel prediction position of the vehicle AM, which is a movable body, in time series based on information concerning an own vehicle position received from the drive control ECU 100. The second calculation unit 192 is connected to the object recognition device 20 and uses a position and an actual shape of the object recognized by the object recognition device 20 to perform calculation for determining a presence prediction position of the object in time series. The prediction unit 195 predicts a collision of the vehicle AM and the object based on a time series of the travel prediction positions of the vehicle AM and the time series of the presence prediction positions of the object. The output unit 197 performs outputting to the drive control ECU 100 as required depending on the content of the prediction by the prediction unit 195. The units such as the first calculation unit 191 is implemented by a computer, which is mounted to the collision prevention device 190, executing a prepared program.

Figure 9:
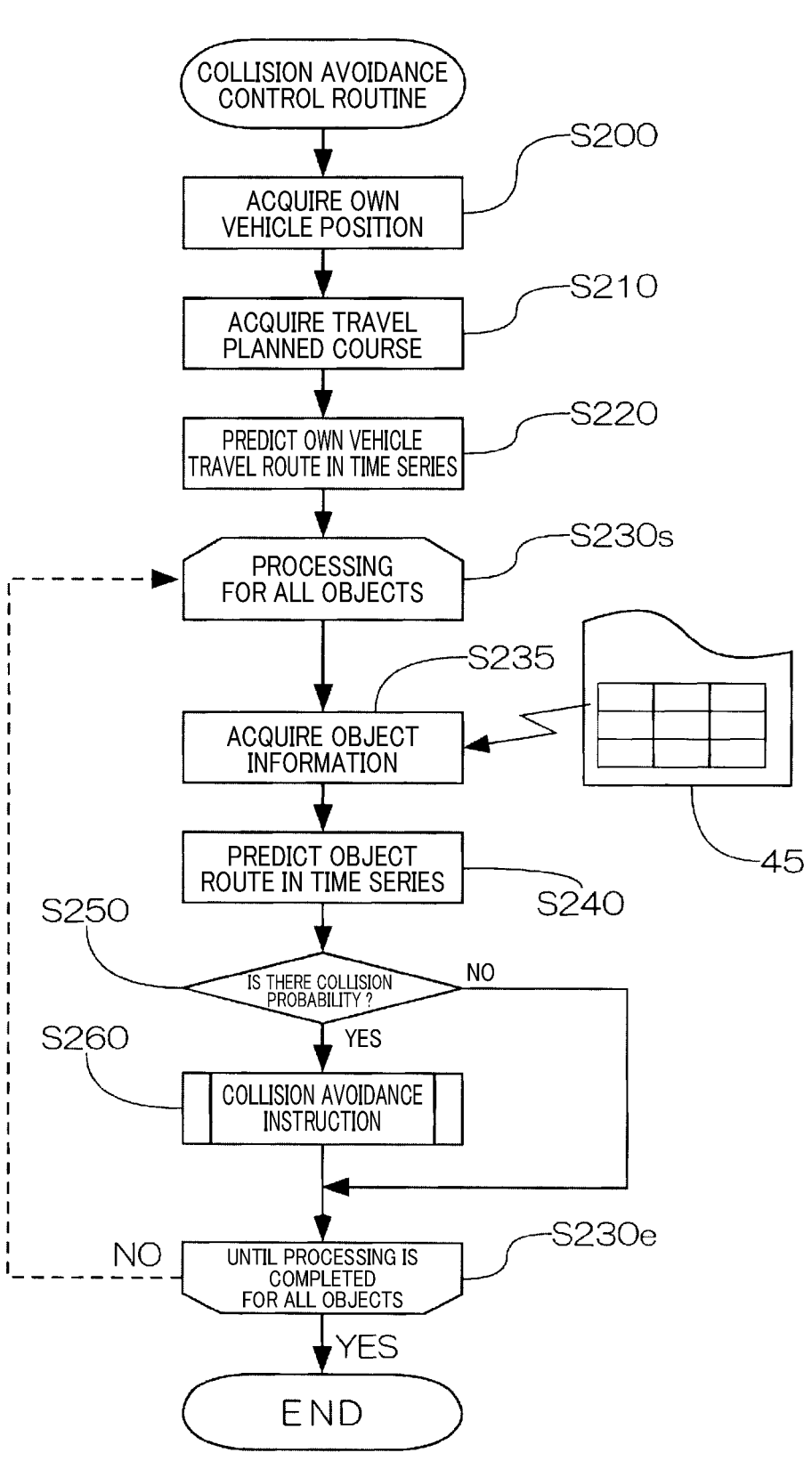
FIG. 9 is a flowchart illustrating a collision avoidance control routine.

Next, with reference to FIG. 9, a collision avoidance control routine performed by the collision prevention device 190 together with the drive control ECU 100 will be described. On starting the collision avoidance control routine, first, a position of the own vehicle (own vehicle position) is acquired (step S200). The own vehicle position can be acquired with high accuracy by, for example, a global navigation satellite system (GNSS) provided to the route guidance device 110. A positional relationship with a surrounding landscape, a traffic lane, or the like captured by a camera may be added to the own vehicle position acquired by the GNSS to acquire the own vehicle position with accuracy of several centimeters to several tens of centimeters. Next, a travel planned course is acquired from the route guidance device 110 (step S210).

By using the own vehicle position and the travel planned course, an own vehicle travel planned route is predicted in time series (step S220). The own vehicle travel planned route can be predicted with high accuracy, by superposing the own vehicle position acquired with high accuracy on a drive state planned by the route guidance device 110 on the travel course acquired by the route guidance device 110. Specifically, the own vehicle position in a travel lane is specified, and the travel planned route is determined by adding the shape of the road, a future speed planned by the drive control ECU 100, presence or absence of travel lane change, plans of a left turn and a right turn, and the like. Since the own vehicle position changes with time, the travel planned route is gradually updated. The travel planned route is not only a plot of continuous positions through which the own vehicle passes but also accumulation of information on a position and time at which the own vehicle is present. The unit of time is, for example, 0.1 seconds in actual time, and the own vehicle position is predicted at the time. This is the meaning of "time series". For example, a vehicle traveling at 60 km/h travels approximately 1.7 m in 0.1 s. To avoid a collision, the own vehicle position within a range of, for example, 170 m per 10 s, is predicted in time series.

Figure 10:
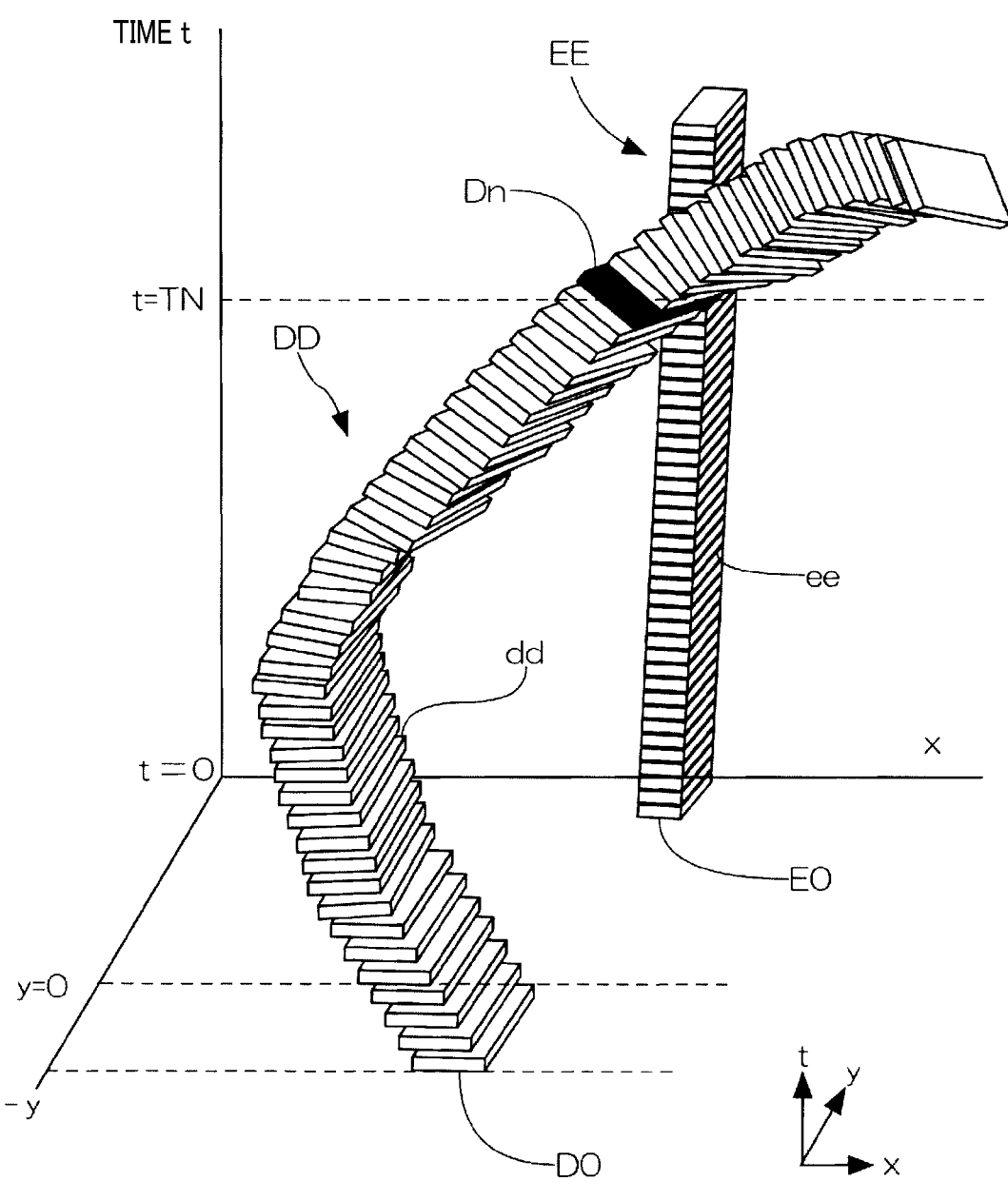
FIG. 10 is an explanatory diagram illustrating an example of three-dimensional prediction of a travel route.

An example of a state of prediction in time series of the own vehicle travel planned route is illustrated in FIG. 10. In FIG. 10, x and y indicate a two-dimensional position on a travel path. Actually, x and y indicate a position represented as a latitude and a longitude. Although an actual travel path has a difference in height and rises and falls, since a vehicle and a pedestrian do not leave a road surface, it is sufficient for the own vehicle position to specify a two-dimensional position, that is, a position on an x-y plane. In a case of a movable body such as a drone and a helicopter, which can move three-dimensionally, position information is also three-dimensional. In FIG. 10, the time axis t is in a direction perpendicular to the x-y plane. If the position information is three-dimensional, a time series representation of the own vehicle position is four-dimensional.

In FIG. 10, positions of the own vehicle AM are represented as a locus DD in time series. In this example, the own vehicle AM is located at a position D0 at present time. When the own vehicle AM travels in the y direction from the position D0, it is predicted that, in accordance with the control by the drive control ECU 100, the own vehicle AM slightly moves from the current position in the −x direction and thereafter changes the course in the x direction, that is, turns right. In FIG. 10, rectangular parallelopipeds represent a shape circumscribed to the own vehicle AM. The inclination of the rectangular parallelopiped indicates an attitude of the vehicle. It is noted that the attitude is schematically shown and does not necessarily represent an actual attitude when the vehicle is traveling.

As described above, after predicting the own vehicle travel route in time series, the CPU repeats the processing in step S230s to S230e for all of the objects recognized by the object recognition device 20 at the time point. Specifically, the object recognition device 20 first accesses the database 45 storing objects recognized at the time point, and acquires stored one item of information on the object (step S235). The object information acquired herein is information on each object registered in the database 45 at the time point and is data indicating a size and a position of the object. The database 45 stores data on a shape and a position, which have been recognized, of each of the plurality of objects. Some of the objects recognized in the past are not recognized at present time in an image picked up by the camera 21. Such data on the object that is not recognized at present time are sequentially deleted from the database 45. Hence, the object extracted in step S235 is recognized from the image picked up by the camera 21 at the present time point and is one of the objects whose data on previous shapes and positions are stored in the database 45. When a plurality of objects are stored in the database 45, in order to determine a probability of a collision, the information on the objects is sequentially acquired from the database 45 in order from the object present at the position closest to the own vehicle AM. Instead of the object present at the position closest to the own vehicle, the information may be sequentially acquired in order from the largest object or may be acquired randomly.

As described in the first embodiment, the information on the object is acquired by extracting the object from the image picked up by the camera 21, determining whether the object is the first type object larger than a four or more-wheeled vehicle or the second type object, which is a two-wheeled vehicle, a pedestrian, or the like, smaller than the first type object, and performing the first correction or the second correction. Since the position of the object is defined as a relative position (distance L2 or P2 and angles θ1, θ2, θ3) with respect to the own vehicle AM, the position is converted to coordinates on a two-dimensional x-y plane similarly by using the two-dimensionally determined own vehicle position.

On acquiring such object information, the CPU next performs processing for predicting a route of the object in time series (step S240). In any case in which the object is a four-wheeled vehicle, a two-wheeled vehicle, or a pedestrian, a moving object can be predicted to continuously move. Hence, a future position of the object is predicted by using the positions at which the object has been present. FIG. 10 illustrates a case in which, the object that has been present at a position E0 at time t=0 is a pedestrian, and the object is moving in the x direction slowly. In this example, the object is at the position E0 at present time and is predicted to move in the x direction from the position E0. In FIG. 10, rectangular parallelopipeds represent a shape circumscribed to the pedestrian. Although the moving speed of the pedestrian is lower than that of the own vehicle Am, since the vertical axis in FIG. 10 indicated time t, a rectangular parallelopiped dd representing the own vehicle Am and a rectangular parallelopiped ee representing the pedestrian are arranged at equal distances in the vertical axis direction. For the object that is moving at a low speed, intervals on the time axis for detection and prediction of the positions may be long.

After predicting the route of the object in time series (step S240), the CPU determines whether there is a probability that the own vehicle AM collides with the object whose route is predicted in time series (step S250). The probability of the collision is determined not based on simply whether the own vehicle AM and a locus of the object on the space, herein, the two-dimensional plane intersect with each other, but based on whether the own vehicle AM and a locus intersect with each on the coordinate system including the time axis illustrated in FIG. 10. In the example illustrated in FIG. 10, at time t=TN, the rectangular parallelopiped dd representing the own vehicle AM and the rectangular parallelopiped ee representing the pedestrian intersect with each other on the loci DD, EE including volumes of the rectangular parallelopipeds, whereby it is determined that there is a probability of a collision.

If determining that there is a probability of a collision, the collision prevention device 190 instructs the drive control ECU 100 to perform collision avoidance (step S260). At this time, the collision prevention device 190 outputs at least the locus EE of the object to the drive control ECU 100. The instructed drive control ECU 100 recognizes a locus of the object that is determined that there is a probability of a collision and controls driving of the own vehicle AM so that the own vehicle AM does not intersect with the locus. Specifically, if there is enough time until predicted collision time TN with the object, the drive control ECU 100 instructs the driving force ECU 120 to change, for example, decrease the vehicle speed to change the speed of the own vehicle AM, thereby delaying (or hastening in some cases) the time at which the own vehicle arrives at a predicted collision position. Alternatively, in addition to the instruction to the driving force ECU 120, the drive control ECU 100 may instruct the braking force ECU 170 to perform braking to suddenly decrease the speed of the own vehicle AM, thereby delaying the time at which the own vehicle arrives at the predicted collision position. Alternatively, the drive control ECU 100 may instruct the steering ECU 140 to steer wheels to change a travel route, thereby avoiding a collision. Alternatively, a collision may be avoided by a method such as sounding a horn, issuing an alert to the driver so as to change to manual driving, and the like.

In step S250, regarding an object determined that there is a probability of a collision, if determining that there is no probability of a collision, the CPU does not perform the processing in step S260. After the determination of a probability of a collision (step S250) and processing for collision avoidance instruction (step S260), the CPU determines whether processing for all the objects is completed (step S230e), and repeats the above processing (step S235 to S260). If the processing has been completed for all the objects, the CPU ends the present processing routine. The processing for collision avoidance is performed by increasing and decreasing the vehicle speed and steering for collision avoidance so that a collision with another object does not occur.

According to the vehicle drive control device 200 as a collision prevention device described as the second embodiment, a result of recognition of an object by the object recognition device 20 described in the first embodiment is used to determine a probability of a collision between the own vehicle AM and the object. If there is a probability of a collision, the drive control ECU 100 controls the own vehicle AM so as to avoid the collision. As described in the first embodiment in detail, the object recognition device 20 performs the first correction in which when the object is the first type object, the size of the object, which is acquired by the camera 21 as the first sensor, on a plane is corrected by using the distance measurement result of the millimeter-wave radar 22 as the second sensor. If the object is the second type object, while the shape of the object acquired by the camera 21, which is a first sensor, is maintained, the second correction in which the position of the object is used as a result measured by the millimeter-wave radar 22. Hence, the shape and the position of the object can be detected with high accuracy based on the shape and distance of the object acquired by the monocular camera 21, and a probability of a collision can be predicted with high accuracy based on the shape and the distance of the object. As a result, a probability of implementing collision prevention can be increased. Such determination of a probability of a collision and avoidance processing by the vehicle drive control device 200 is described in, for example, JP-A-2020-8288 in detail.

C: Other Embodiments

The devices disclosed in the present disclosure can be implemented by the following embodiments.

(1) An embodiment is an object recognition device. The object recognition device includes a first sensor that acquires an image of an object present outside a movable body, a second sensor that detects a distance to the object, and a recognition unit that recognizes a position of the object with respect to the movable body and a shape of the object at the position by using the first sensor and the second sensor. If determining that the object is a first type object having a size equal to more than a predetermined size, the recognition unit determines an actual shape of the object based on an image of the object acquired by the first sensor and the distance detected by the second sensor, and recognizes that the object is present as the actual shape at a position distanced from the movable body by the distance. Hence, the object recognition device can recognize the actual shape of the first type object having a size equal to more than the predetermined size with high accuracy.

The movable body may be an automobile or a two-wheeled vehicle, a pedestrian, or a train that moves on the ground or a ship, a submarine, or a hovercraft that moves on or under water. The movable body may be a flying object such as an airplane, a helicopter, or a drone. The object may move similarly to or differently from the movable body. For example, when the movable body is a vehicle that moves on the ground, although the object may be an automobile, a two-wheeled vehicle, or pedestrian, the object may be an object that three-dimensionally moves such as a drone. The movable body may move on predetermined rails such as a train, and the object may be a vehicle that crosses a railroad crossing. The object may not move. For example, if the movable body moves on the ground, the object may be a feature on the ground such as a guardrail, a road sign, and a curb. If the movable body is a ship or the like, the object may be a quay or a buoy. If the movable body is an aircraft, the object may be a steel tower, a high-rise building, or the like.

(2) In the object recognition device described above, the recognition unit may recognize the first type object as a polygonal shape from the image, maintain angles of two or more of the vertexes configuring the polygonal shape with respect to the movable body, and correct the polygonal shape to a similarity shape so that the object having the polygonal shape is present at the distance, to determine the actual shape of the object at the position according to the similarity shape. Thereby, the actual object having a complicated shape is approximated by the polygonal shape, whereby the actual shape can be recognized. The recognition of the object may be performed by not only the polygonal shape but also a circle, an elliptical shape, a shape surrounded by an arbitrary curve. If the movable body two-dimensionally moves on a road surface or a water surface, as in a vehicle and a ship, the real shape of the object is recognized as a polygonal shape in plan view. If the movable body three-dimensionally moves, as in a drone, a helicopter, an airplane, and a submarine, the actual shape of the object may be recognized as a polygon. In the case of the latter, the actual shape of the first type object may be determined by correcting the polygon to a similarity shape by using at least three vertexes of the polygon.

(3) In the object recognition device, the polygonal shape may be a quadrangular shape. The first type object having a size equal to or more than a predetermined size, such as a vehicle, can be approximated with high accuracy by the quadrangular shape, and can be corrected easily. The polygonal shape is not necessarily a quadrangular shape but may be a polygonal shape such as a triangular shape or a pentagonal or higher order shape.

(4) In the object recognition device, if determining that the object is the second type object, the recognition unit may perform the recognition of an actual shape of the object at the position by a method different from that for the first type object. This is because since the first type object has a size equal to more than a predetermined size, and the second type object has a different size, there is a case in which it is desired to recognize the actual shape by a different method. For example, it is assumed that since the size of the second type object is smaller than that of the first type object, if the size of the second type object is corrected to be large, errors become large. In such a case, there is a case in which a method not correcting the size is desirable. In the case of the second type object, the recognition of the actual shape may not be performed.

(5) In the object recognition device, the second type object can be specified as an object smaller than the first type object. The recognition unit may recognize that the second type object is present at the position distanced from the movable body by the distance, and has a shape having a size corresponding to the image of the object. Thus, the processing for the second type object can be simplified.

(6) In the object recognition device, the recognition unit may recognize the second type object as a predetermined shape including a representative point representing the object from the image, maintain an angle of the representative point with respect to the movable body and the predetermined shape, and determine the actual shape of the object at the position assuming that an object having the predetermined shape is present at the distance. Thus, the position of the second type object can be determined with high accuracy by using the distance obtained by the second sensor.

(7) In the object recognition device, the movable body is a vehicle, and the second type object may be a two-wheeled movable body or a pedestrian. Since the ranges of the size and the shape of two-wheeled movable bodies such as a motorcycle and a bicycle and pedestrians are relatively narrow compared with the first type object such as a four-wheeled vehicle, there is room for recognizing an actual shape by a method different from that for the first type object.

(8) In the object recognition device, the recognition unit may determine the actual shape of the object assuming that the distance detected by the second sensor is to any of 1) a point on an edge closest to the second sensor, 2) a point distanced from the edge to the object side at a predetermined distance, and 3) the center point of the object. Since the position detected by the second sensor is the distance to any of the positions corresponding to the three-dimensional shape of the object, the position detected by the second sensor is desired to be used as any of the above 1), 2), and 3) to recognize the actual shape. If approximate recognition of the three-dimensional shape and measurement of the distance can be performed, the position detected by the second sensor may be handled as a distance to the position of the object corresponding to the measured point.

(9) In the object recognition device, the first type object may be a four or more-wheeled vehicle. This is because, as the object having a size equal to or more than a predetermined size and present around a movable body, the four or more-wheeled vehicle has a high probability, and the actual shape and the distance thereof is required to be recognized for collision avoidance. A larger object such a bus and a truck may be handled as the first type object. If the movable body is a ship, a ship larger than a small-sized ship may be handled as the first type object. The definition may be provided by a length or the like of the body of a ship. If the movable body is a flying object such as a drone, a fixed-wing aircraft such as an airplane, a jet plane, and a glider, which are heavier-than-air aircrafts, a rotary wing plane such as a helicopter, or a lighter-than-air aircraft such as an airship may be handled as the first type object. A flying object smaller than them, for example, a drone, a hang glider, a paraglider, or a microlight may be handled as the second type object. The first type object and the second type object may be distinguished from each other based on the size of a part that does not rotate, such as an airframe.

(10) The second embodiment of the present disclosure is a movable body collision prevention device that includes the object recognition device, a first calculation unit that determines a travel prediction position of the movable body in time series, a second calculation unit that uses a position and an actual shape of the recognized object to determine a presence prediction position of the object in time series, a prediction unit that predicts a collision between the vehicle and the object based on a time series of the travel prediction positions of the vehicle and the time series of the presence prediction positions of the object, and an output unit that outputs the prediction. This can recognize an actual shape and a position of the object with high accuracy to predict a collision, whereby the collision can be easily prevented.

(11) The movable body collision prevention device may include a movable body control device that receives the prediction output by the output unit and changes at least one of a velocity and a traveling direction of the movable body so as to avoid the predicted collision. In some situations, collisions can be prevented by issuing an alert or changing to manual driving. However, changing the velocity and the traveling direction can increase reliability of collision prevention. In addition, collisions may be prevented by changing arrival time at a predicted collision position or issuing an alert to the driver. If information can be transmitted to the object, the prediction of a collision may be transmitted to the object to change the velocity, the traveling direction, and the like on the object side, thereby preventing a collision. Various method of transmitting information to the object can be employed such as direct communication, communication through an information center or the like, a warning sound, a voice, and an optical method such as warning light.

(12) The movable body may be a vehicle including the above movable body collision prevention device. Since there are a large number of vehicles, which are movable bodies, and the vehicle may actually cause a collision with another vehicle or a pedestrian, providing the movable body collision prevention device to the vehicle, which is a movable body, has a merit in prevention of a collision.

(13) The third embodiment of the present disclosure is an object recognition method in which an image of an object present outside a movable body is acquired, and a distance to the object is detected. If determining that the object is a first type object whose size can be previously specified, an actual shape of the object is determined based on an image of the object and the distance, and it is recognized that the object is present as the actual shape at a position distanced by the distance. Thus, the actual shape of the first type object having a size equal to or more than a predetermined size can be recognized with high accuracy.

(14) The fourth embodiment of the present disclosure includes a first sensor that acquires an image of an object present outside a movable body, a second sensor that detects a distance to the object, and a recognition unit that recognizes a position of the object with respect to the movable body and a shape of the object at the position by using the first sensor and the second sensor. The recognition unit changes a method for recognizing an actual shape of the object at the position depending on the type of the object, and recognizes the actual shape of the object at the position by the changed method. Hence, when an accrual shape of an object at a position detected by the second sensor is recognized depending on the type of the object, the recognition can be performed by a changed appropriate method, whereby accuracy in recognizing the actual shape can be easily set depending on the type of the object.

(15) In the above embodiments, part of the configuration implement by hardware may be replaced with software. At least part of the configuration implement by software can be implemented by discrete circuit configurations. When part or all of the functions of the present disclosure is implemented by software, the software (computer program) can be provided in the form stored in a computer-readable storage medium. The computer-readable storage medium is not limited to a portable storage medium such as a flexible disk and a CD-ROM but includes an internal storage device of the computer such as a RAM, a ROM, and the like and an external storage device fixed to the computer such as a hard disk. That is, the computer-readable storage medium has a broad meaning including any storage medium capable of storing data packets non-transitorily and in a non-volatile manner.

The control unit and the method executed by the control unit described in the present disclosure may be implemented by a dedicated computer including a processor and a memory programmed to execute one or more functions embodied by computer programs. Alternatively, the control unit and the method executed by the control unit described in the present disclosure may be implemented by a dedicated computer including a processor formed of one or more dedicated hardware logical circuits. The control unit and the method executed by the control unit described in the present disclosure may be implemented by one or more dedicated computers including a combination of a processor and a memory programmed to execute one or more functions and a processor including one or more hardware logical circuits. The computer programs may be stored, as instructions to be executed by a computer, in a computer-readable non-transitory tangible storage medium.

The present disclosure is not limited to the above-described embodiments and can be implemented with various configurations within a scope not deviating from the gist of the present disclosure. For example, technical features in the embodiments can be appropriately replaced or combined with each other in order to solve all or part of the objects described above or to achieve all or part of the effects described above. Some of the technical features can be appropriately deleted if they are not described as essentials herein.

The present disclosure can be implemented as the following aspect or examples of application. The first embodiment is an aspect as an object recognition device. The object recognition device includes a first sensor (21) that acquires an image of an object (CA, PR) present outside a movable body (10, AM), a second sensor (22) that detects a distance to the object, and a recognition unit (40) that recognizes a position of the object with respect to the movable body and a shape of the object at the position by using the first sensor and the second sensor. If determining that the object is a first type object (CA) having a size equal to more than a predetermined size, the recognition unit determines an actual shape of the object based on an image of the object acquired by the first sensor and the distance (L2) detected by the second sensor, and recognizes that the object is present as the actual shape at a position distanced from the movable body by the distance. Hence, the object recognition device can recognize the actual shape of the first type object having a size equal to more than the predetermined size with high accuracy.

The second embodiment of the present disclosure is a movable body collision prevention device that includes the object recognition device (20), a first calculation unit (191) that determines a travel prediction position of the movable body in time series, a second calculation unit (192) that uses a position and an actual shape of the recognized object to determine a presence prediction position of the object in time series, a prediction unit (195) that predicts a collision between the vehicle and the object based on a time series of the travel prediction positions of the vehicle and the time series of the presence prediction positions of the object, and an output unit (197) that outputs the prediction. This can recognize an actual shape and a position of the object with high accuracy to predict a collision, whereby the collision can be easily prevented.

The third embodiment of the present disclosure is an object recognition method in which an image of an object present outside a movable body is acquired, and a distance to the object is detected. If determining that the object is a first type object whose size can be previously specified, an actual shape of the object is determined based on an image of the object and the distance, and it is recognized that the object is present as the actual shape at a position distanced by the distance. Thus, the actual shape of the first type object having a size equal to or more than a predetermined size can be recognized with high accuracy.

What is claimed is:

1. An object recognition device, comprising:
a first sensor that acquires an image of an object present outside a movable body;
a second sensor that detects a distance to the object;
a first memory that stores instructions; and
a first processor, wherein the first processor executes the instructions to perform:
acquiring an image of the object using the first sensor;
estimating a first distance to the object based on the image of the object from the first sensor;
detecting a second distance to the object using the second sensor;
determining whether the object is a first type object having a size equal to or greater than a predetermined size or a second type object being a two-wheeled movable body or a pedestrian;
when determining that the object is the first type object, generating a polygonal shape of the object in a bird eye's view based on the image of the object acquired by the first sensor, and initially positioning the polygonal shape in the bird eye's view at the first distance from the movable body, wherein the polygonal shape comprises two or more of vertexes, and the two or more of vertexes are positioned at respective angles relative to a position of first sensor;
correcting the position and a size of the polygonal shape in the bird eye's view, wherein the position of the polygonal shape is corrected by positioning the polygonal shape at the second distance detected by the second sensor, and the size of the polygonal shape is corrected by increasing or decreasing the size of polygonal shape, wherein the corrected size of the polygonal shape is determined by maintaining the respective angles of the two or more of vertexes relative to the position of first sensor while positioning the polygonal shape at the second distance detected by the second sensor; and
outputting a recognition result for a prediction of a collision between the movable body and the object using the corrected polygonal shape.

2. The object recognition device according to claim 1, wherein
the polygonal shape is a quadrangular shape.

3. The object recognition device according to claim 1, wherein
when determining that the object is the second type object, the first processor performs the recognition of the actual shape of the object at the position by a method different from that of the first type object.

4. The object recognition device according to claim 3, wherein
the second type object is capable of being specified as an object smaller than the first type object, and
the first processor recognizes that the second type object is present at a position distanced from the movable body by the distance and has a shape having a size corresponding to the image of the object.

5. The object recognition device according to claim 3, wherein
the first processor recognizes the second type object as a predetermined shape including a representative point representing the object from the image, maintains an angle of the representative point with respect to the movable body and the predetermined shape, and determines the actual shape of the object at the position assuming that an object having the predetermined shape is present at the distance.

6. The object recognition device according to claim 1, wherein
the first processor generates the polygonal shape of the object assuming that the distance detected by the second sensor is to any of 1) a point on an edge closest to the second sensor, 2) a point distanced from the edge to an object side at a predetermined distance, and 3) a center point of the object.

7. The object recognition device according to claim 1, wherein
the first type object is a four or more-wheeled vehicle.

8. A movable body collision prevention device, comprising
a first sensor that acquires an image of an object present outside a movable body;
a second sensor that detects a distance to the object;
a first memory that stores instructions; and
a first processor,
wherein the first processor executes the instructions to perform:
acquiring an image of the object using the first sensor;
estimating a first distance to the object based on the image of the object from the first sensor;
detecting a second distance to the object using the second sensor;
determining whether the object is a first type object having a size equal to or greater than a predetermined size or a second type object being a two-wheeled movable body or a pedestrian,
when determining that the object is the first type object, generating a polygonal shape of the object in a bird eye's view based on the image of the object acquired by the first sensor, and initially positioning the polygonal shape in the bird eye's view at the first distance from the movable body, wherein the polygonal shape comprises two or more of vertexes, and the two or more of vertexes are positioned at respective angles relative to a position of first sensor;
correcting the position and a size of the polygonal shape in the bird eye's view, wherein the position of the polygonal shape is corrected by positioning the polygonal shape at the second distance detected by the second sensor, and the size of the polygonal shape is corrected by increasing or decreasing the size of polygonal shape, wherein the corrected size of the polygonal shape is determined by maintaining the respective angles of the two or more of vertexes relative to the position of first sensor while positioning the polygonal shape at the second distance detected by the second sensor; wherein
the movable body collision prevention device further comprising:
a second memory that stores instructions; and
a second processor,
wherein the second processor executes the instructions to perform:
determining a travel prediction position of the movable body in time series;
determining a presence prediction position of the object in time series using the corrected polygonal shape;
predicting a collision between the movable body and the object based on a time series of the travel prediction positions of the movable body and the time series of the presence prediction positions of the object; and
outputting the prediction.

9. The movable body collision prevention device according to claim 8, further comprising a movable body control device that receives the prediction output and changes at least one of a velocity and a traveling direction of the movable body so as to avoid the predicted collision.

10. A vehicle, comprising the movable body collision prevention device according to claim 8, wherein
the movable body is a vehicle.

11. An object recognition method performed by a processor that executes instructions stored in a memory, the method comprising:
acquiring an image of an object present outside a movable body using a first sensor;
estimating a first distance to the object based on the image of the object;
detecting a second distance to the object using a second sensor;
determining whether the object is a first type object having a size equal to or greater than a predetermined size or a second type object being a two-wheeled movable body or a pedestrian;
when determining that the object is the first type object, generating a polygonal shape of the object in a bird eye's view based on the image of the object acquired by the first sensor, and initially positioning the polygonal shape in the bird eye's view at the first distance from the movable body, wherein the polygonal shape comprises two or more of vertexes, and the two or more of vertexes are positioned at respective angles relative to a position of first sensor;
correcting the position and a size of the polygonal shape in the bird eye's view, wherein the position of the polygonal shape is corrected by positioning the polygonal shape at the second distance detected by the second sensor, and the size of the polygonal shape is corrected by increasing or decreasing the size of polygonal shape, wherein the corrected size of the polygonal shape is determined by maintaining the respective angles of the two or more of vertexes relative to the position of first sensor while positioning the polygonal shape at the second distance detected by the second sensor; and
outputting a recognition result for prediction a collision between the movable body and the object using the corrected polygonal shape.

12. An object recognition device, comprising:
a first sensor that acquires an image of an object present outside a movable body;
a second sensor that detects a distance to the object;
a first memory that stores instructions; and
a first processor, wherein the first processor executes the instructions to perform:
acquiring an image of the object;
estimating a first distance to the object based on the image acquired by the first sensor;
detecting a second distance to the object using the second sensor;
generating a polygonal shape of the object in a bird eye's view based on an image of the object acquired by the first sensor, and initially positioning the polygonal shape in the bird eye's view at the first distance from the movable body, wherein the polygonal shape comprises two or more of vertexes, and the two or more of vertexes are positioned at respective angles relative to a position of first sensor;
correcting the position and a size of the polygonal shape in the bird eye's view, wherein the position of the polygonal shape is corrected by positioning the polygonal shape at the second distance detected by the second sensor, and the size of the polygonal shape is corrected by increasing or decreasing the size of polygonal shape, wherein the corrected size of the polygonal shape is determined by maintaining the respective angles of the two or more of vertexes relative to the position of first sensor while positioning the polygonal shape at the second distance detected by the second sensor; and outputting a recognition result for a prediction of a collision between the movable body and the object using the corrected polygonal shape.

* * * * *